(12) United States Patent
Silva et al.

(10) Patent No.: US 6,426,008 B2
(45) Date of Patent: *Jul. 30, 2002

(54) METHOD FOR REDUCING METAL ION CONCENTRATION IN BRINE SOLUTION

(75) Inventors: James Manio Silva, Clifton Park; Donald Franklin Foust, Glenville; Thomas Joseph Fyvie, Schenectady, all of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/378,957

(22) Filed: Aug. 23, 1999

(51) Int. Cl.[7] ............................................. B01D 15/00
(52) U.S. Cl. ........................ 210/669; 210/681; 210/687; 210/688
(58) Field of Search ................ 210/669, 687, 210/688, 681

(56) References Cited

U.S. PATENT DOCUMENTS

| 4,060,465 A | * | 11/1977 | Yokota et al. | ............... 210/687 |
| 4,119,508 A | | 10/1978 | Yokota et al. | ............... 204/128 |
| 4,303,704 A | | 12/1981 | Courduvelis et al. | ....... 427/345 |
| 4,367,330 A | | 1/1983 | Hucks et al. | ............... 528/196 |
| 4,450,057 A | | 5/1984 | Kelly | ........................... 204/98 |
| 4,818,773 A | | 4/1989 | Cornette et al. | ............. 521/32 |
| 6,103,092 A | * | 8/2000 | Silva | ........................... 210/687 |

FOREIGN PATENT DOCUMENTS

| JP | 53058995 | 5/1978 |
| JP | 54002998 | 1/1979 |
| JP | 57149823 | 9/1982 |
| JP | 04004092 | 1/1992 |
| WO | 0024674 | 5/2000 |

* cited by examiner

*Primary Examiner*—Ivars Cintins
(74) *Attorney, Agent, or Firm*—Andrew J. Caruso; Noreen C. Johnson

(57) ABSTRACT

This invention relates to a method for removing impurities from a brine solution, the brine solution comprising a water soluble chelating agent, the method comprising the steps of:

a) adjusting the pH of the brine solution to a pH of from about 2 to about 4;

b) passing the brine solution through a first functionalized resin; the first functionalized resin having functional groups capable of removing multivalent metal cations from the brine solution;

c) adjusting the pH of the brine solution to a pH of from about 9 to about 11.5; and d) passing the brine solution through a second functionalized resin; the second functionalized resin having functional groups capable of removing alkaline earth metal cations from the brine solution.

13 Claims, No Drawings

METHOD FOR REDUCING METAL ION CONCENTRATION IN BRINE SOLUTION

FIELD OF THE INVENTION

This invention relates to a method for reducing the concentration of multivalent metal cations in a brine solution containing a metal chelating agent. In particular, this invention relates to a method for reducing the concentration of multivalent metal cations in a brine solution involving the use of a membrane electrolyzer. The brine solution is a product of a condensation polymer manufacturing process and contains a water-soluble chelating agent, such as sodium gluconate.

BACKGROUND OF THE INVENTION

The manufacture of condensation polymers often produces a brine solution as a by-product. For example, a brine solution is produced in the manufacture of polycarbonate resins through the reaction of phosgene with at least one bisphenol compound in an organic solvent in the presence of aqueous sodium hydroxide. A common example is the reaction of bisphenol A with phosgene in dichloromethane in the presence of aqueous sodium hydroxide to produce bisphenol A polycarbonate and sodium chloride solution.

To reduce production costs and avoid environmental pollution, such brine solutions are often recycled to a chlor-alkali plant for electrolysis to produce chlorine gas, sodium hydroxide solution, and hydrogen gas. The electrolysis cells in such chlor-alkali plants frequently comprise an anode compartment and a cathode compartment with an appropriate separator in between the two compartments. The purpose of the separator is to separate the anolyte solution and the chlorine gas evolved at the anode from the catholyte solution and the hydrogen gas evolved at the cathode, within the electrolysis cell. The separator may be at least partially porous to water. The types of separators used in electrolysis cells include diaphragms and membranes.

During membrane electrolysis cell operation, the ion exchange membrane separator may gradually become plugged by the accumulation of solid material, retarding the passage of water and dissolved species from anolyte solution to catholyte solution. Separator plugging decreases the efficiency of cell operation and lowers the production rate of products arising from electrolysis. When plugging reaches a critical point, the separator must be replaced, often before its expected lifetime is reached. To achieve most economical electrolysis cell operation, it is necessary that the cell separator have as long a lifetime as possible.

Brine solutions arising as by-products from condensation polymer manufacture often contain both organic and inorganic contaminants. Organic contaminants may include residual solvent, catalyst, and aqueous-soluble organic species such as monomer and low molecular weight oligomer. Inorganic contaminants may include multivalent alkaline earth and transition metal cations, particularly iron, calcium, and magnesium. When brine solution containing one or more such contaminants is electrolyzed, both organic species and metal species may precipitate on the surface of and within an electrolysis cell separator to cause plugging. To achieve maximum lifetime of a separator in an electrolysis cell, the concentration of contaminating organic species and multivalent metal cations must be reduced to as low a level as economically possible in the feed-brine solution.

In order to lower the concentrations of organic and inorganic contaminants to levels suitable for feeding the brine to membrane electrolytic cells, primary and secondary brine treatment are often employed. In primary brine treatment, the brine pH is elevated to above about 10 in the presence of a molar excess of carbonate ion in order to precipitate alkaline earth and transition metals as their carbonates and/or hydroxides, followed by a filtering or settling process such as clarification. This is followed by acidification and stripping of the brine to remove carbonate ion as well as organic contaminants such as organic solvents and dissolved catalysts. Additional treatment such as adsorption may be utilized as necessary to remove organic species such as monomer and low molecular weight oligomer from the brine.

In secondary brine treatment, the brine pH is adjusted to about 8–11 and the brine is treated in a chelating ion exchange resin such as aminomethylphosphonic acid-functionalized polystyrene resin (AMP resin) or iminodiacetic acid-functionalized polystyrene resin (IDA resin). These resins are both chelating cation exchange resins and are commonly used in the chlor-alkali industry for secondary brine treatment, particularly AMP resin. This treatment normally reduces the concentration of alkaline earth metal ions such as calcium and magnesium to levels that are acceptable for use in membrane electrolyzers. Typical membrane electrolyzers require that the combined calcium plus magnesium concentration in the brine be less than 20 ppb.

This combined primary and secondary brine treatment procedure may be effective for reducing impurity concentrations in brine solutions to levels specified for membrane electrolyzers. The concentration of alkaline earth metals is particularly important for membrane electrolyzer operation (20 ppb combined calcium and magnesium). However, it has been found that when a brine solution which results from a condensation polymer manufacturing process, such as a polycarbonate manufacturing process, is treated by primary and secondary brine treatment, the concentration of alkaline earth metal cations in the treated brine exceeds the tolerable level and the membrane electrolyzer separator becomes plugged at an unexpectedly rapid rate, resulting in premature failure.

After careful experimentation it has been discovered that the cause of rapid membrane separator plugging during electrolysis of such brine solution is the precipitation of alkaline earth metal hydroxide species, primarily derived from residual calcium and magnesium in the feed-brine, on the surface of and within the electrolysis cell membrane separator. Analysis has revealed that there is still a very low concentration of alkaline earth metal cations present in electrolyzer feed brine even after primary and secondary brine treatment. Without being bound by any theory, the cause of this problem is believed to be the presence of a water-soluble chelating agent in the brine solution. The chelating agent apparently retains some fraction of the transition metal cations as water-soluble complexes so that these complexed cations are not precipitated as salts during primary brine treatment. These complexed transition metal cations are more strongly bound to the ion exchange resin than alkaline earth metal cations in secondary brine treatment. Therefore, during ion exchange treatment (secondary brine treatment) they displace alkaline earth metal cations from the ion exchange resin into the brine solution. These displaced alkaline earth metal cations then exit the ion exchange column with the brine and cause precipitation on an inside the membrane separator in the electrolytic cell. The chelating agent is typically a sugar acid such as gluconate anion.

Gluconate anion is often added in the form of sodium gluconate in condensation polymer manufacturing processes to form water-soluble complexes with a fraction of the multivalent transition metal cations such as iron (III), nickel (II), and chromium (III). Complexation beneficially hinders transition metal salts from precipitating in the manufacturing equipment and from contaminating the polymer product. With iron (III), for example, gluconate anion forms an iron-gluconate complex, thereby solubilizing iron in the brine solution so that the polymer product is produced substantially free of iron contamination. However, when the brine solution undergoes primary brine treatment, the fraction of a transition metal species such as iron (III) that exists as a gluconate complex remains strongly chelated and thus remains in solution through the end of primary brine treatment. These transition metal gluconate complexes such as iron (III) gluconate are much more strongly bound to both AMP and IDA resins than are alkaline earth metal cations. Therefore, when brine that contains iron (III) gluconate enters a bed of chelating ion exchange resin, alkaline earth metal cations are displaced from the resin and are dissolved in the brine, typically as gluconate complexes. Under these conditions, it is not possible to achieve the 20 ppb alkaline earth metal cation specification for brine leaving secondary brine treatment. When brine containing metal-gluconate complexes such as an alkaline earth metal-gluconate complex enters a membrane electrolytic cell, the gluconate is substantially destroyed by oxidation by chlorine, and at least a portion of the alkaline earth metals precipitates on the surface of and inside the membrane. The precipitated alkaline earth metal species gradually plug the membrane and force lower production rates from the electrochemical cell and lead to premature membrane failure.

Methods for removing metal cations from an aqueous solution have been reported. Removal of multivalent metal cations from an aqueous solution using a chelating ion exchange resin is known. For example, Yokota et al. (U.S. Pat. No. 4,119,508) employ a chelating ion exchange resin to remove calcium and magnesium cations from a brine solution in the absence of a water-soluble metal chelating agent. Kelly (U.S. Pat. No. 4,450,057) utilizes AMBERLITE® IRC-718 chelating ion exchange resin (Rohm and Haas Company) to remove aluminum (III) from brine at pH 2 to 3 in the absence of a water-soluble metal chelating agent. Courduvelis et al. (U.S. Pat. No. 4,303,704) utilize AMBERLITE® IRC-718 resin at either acidic or alkaline pH to recover and reuse very high concentrations of copper or nickel ions from non-brine aqueous solutions derived from an electroless plating process and containing chelating agents such as alkanolamines. However, these methods do not address achieving membrane electrolyzer specification levels of alkaline earth metal cations in brine solutions derived from a condensation polymer manufacturing process and containing a water-soluble metal chelating agent.

Commonly owned copending application 09/177,588 discloses a method for increasing the life-time of a preferably diaphragm separator in an electrolysis cell for electrolyzing brine solution containing a water-soluble metal chelating agent.

Diaphragm separators are often composed substantially of a porous asbestos or polytetrafluoroethylene. In contrast, membrane separators often comprise a substantially non-porous polymeric film ion exchange resin which selectively passes alkali metal cations such as sodium, but not anions, from the anolyte solution to the catholyte solution, and which substantially retards back-migration of hydroxide anions from the catholyte solution to the anolyte solution.

There is thus a need for a method which will substantially reduce the concentration of multivalent metal cations, particularly alkaline earth metal cations, in brine solution derived from a condensation polymer manufacturing process and containing a water-soluble metal chelating agent. Such a method provides a means to retard the decrease of the lifetime of an electrolysis cell separator, such as a membrane, by reducing the rate of precipitation of metal species on the surface of and inside the separator, thereby increasing the separator lifetime. It would further be desirable to replace asbestos diaphragms with membrane separators. Asbestos poses health and environmental issues. Further, the supply of asbestos in the future is uncertain. Commercially available non-asbestos diaphragm materials not only permit the elimination of asbestos, a hazardous material, but also have the potential for cost savings from lower electrical usage and longer diaphragm life. Establishing a process that purifies condensation polymer manufacturing brine that contains soluble chelating agents to membrane electrolyzer specifications enables use of membrane electrolyzers for conversion of such brines to chlorine and caustic soda.

SUMMARY OF THE INVENTION

In one aspect, the invention relates to a method for removing impurities from a brine solution, the brine solution comprising a water soluble chelating agent, the method comprising the steps of:

a) adjusting the pH of the brine solution to a pH of from about 2 to about 4;

b) passing the brine solution through a first functionalized resin; the first functionalized resin having functional groups capable of removing multivalent metal cations from the brine solution;

c) adjusting the pH of the brine solution to a pH of from about 9 to about 11.5; and d) passing the brine solution through a second functionalized resin, the second functionalized resin having functional groups capable of removing alkaline earth metal cations from the brine solution.

The invention further provides a method to increase the lifetime of a membrane separator in an electrolysis cell for electrolyzing brine solution containing a water-soluble metal chelating agent. It is preferable to pretreat the brine solution in a primary brine treatment stage.

DETAILED DESCRIPTION OF THE INVENTION

The present invention may be understood more readily by reference to the following detailed description of preferred embodiments of the invention and the examples included therein.

Before the present methods are disclosed and described, it is to be understood that this invention is not limited to specific methods or to particular formulations, as such may, of course, vary. It is also to be understood that the terminology used herein is for the purpose of describing particular embodiments only and is not intended to be limiting.

In the specification and claims which follow, reference will be made to a number of terms which shall be defined to have the following meanings:

The singular forms "a", "an" and "the" include plural referents unless the context clearly dictates otherwise.

A "brine solution" is herein defined as an aqueous solution of an alkali metal halide, including but not limited to, sodium chloride, potassium chloride or a mixture thereof.

A "raw brine solution" is a brine solution which has not been treated or purified. "Optional" or "optionally" means that the subsequently described event or circumstance may or may not occur, and that the description includes instances where the event occurs and instances where it does not.

The raw brine solution as contemplated in the present invention may be obtained as a by-product of a manufacturing process, such as a condensation polymer manufacturing process. Condensation manufacturing process that may produce brine as a by-product include, but are not limited to, condensation processes that produce polycarbonates, polyesters, polyarylates, polyamides, polyamideimides, polyetherimides, polyethersulfones, polyetherketones, polyetheretherketones, polyarylene sulfides, polyarylene sulfidesulfones, and the like.

In a polycarbonate production process, for instance, aqueous sodium chloride arises as a by-product when at least one bisphenol is reacted in an organic solvent with phosgene or a carbonate precursor such as an oligomeric carbonate chloroformate in the presence of an aqueous alkaline earth metal hydroxide, such as aqueous sodium hydroxide to produce a polycarbonate. Representative polycarbonate and polycarbonate copolymers that can be made by such a process include, but are not limited to, bisphenol A polycarbonate; 3, 3', 5, 5'-tetramethyl bisphenol A polycarbonate; 3, 3', 5, 5'-tetrabromo bisphenol A polycarbonate, and mixtures thereof.

Before recycling to an electrolysis cell, the concentration of the alkali metal halide in the brine solution, for instance sodium chloride, may be increased to obtain the most efficient operation of the cell. The sodium chloride concentration, for instance, may be increased by the addition of make-up salt. Make-up salt is sodium chloride obtained, for example, from natural ground deposits or from evaporation of sea water.

In the brine solution which is subjected to purification, the amount of sodium chloride in solution ranges from a concentration of about 50 grams per liter of solution to about that concentration at which the solution is saturated with sodium chloride at a given temperature. Preferably, the sodium chloride concentration ranges from about 100 to about 320 grams per liter of solution, more preferably from about 180 to about 315 grams per liter of solution.

Typically, the brine solution by-product is separated from the condensation polymer product and, after various treatment steps to increase the concentration of sodium chloride and to remove contaminants, is recycled to an electrolysis cell to produce chlorine gas, sodium hydroxide solution, and hydrogen gas. Suitable electrolysis cells may comprise an anode compartment and a cathode compartment with an appropriate separator between the two compartments to separate the anolyte solution and the chlorine gas evolved at the anode from the catholyte solution and the hydrogen gas evolved at the cathode within the cell. Optionally, the separator may be at least partially porous to water. Commonly, membrane separators are used to the separate the anode compartment and the cathode compartment.

Membrane separators may comprise an ion exchange resin which selectively passes alkali metal cations, but not anions, from the anolyte solution to the catholyte solution and which substantially retards back-migration of hydroxide anions from the catholyte solution to the anolyte solution.

During operation of a membrane electrolysis cell, solid species may gradually accumulate on the surface of and within the membrane. This causes a general performance decline, in which the current efficiency decreases and the cell voltage increases, resulting in increased power consumption per unit chlorine production. The effects of impurities on membrane cells are documented in a report published by DuPont, "Effect of Impurities on Membrane for Chloralkali Production", James T. Keating, E. I. DuPont de Nemours and Company, Wilmington, Del., USA. Details of the chloralkali process are given by L. C. Curlin, T. V. Bommaraju, and C. B. Hansson in "Alkali and Chlorine Products: Chlorine and Sodium Hydroxide", Kirk-Othmer Encyclopedia of Chemical Technology, fourth edition, vol. 1, pp. 938–1025 (1991).

To maximize membrane lifetime and efficiency of electrolysis cell operation, the brine solution before electrolysis is subjected to purification steps to remove contaminants. Contaminants include both those from the polymer manufacturing process and those from make-up salt, which is often added to brine that is recycled from the polymer manufacturing process. Typical contaminants include phenolic species, organic catalyst and solvent residues, and metal species such as alkaline earth and transition metal cations. Purification steps to remove contaminants include one or more steps of addition of carbonate and hydroxide ion to precipitate metals, clarification, filtration, volatiles stripping, contact with an adsorbent to remove polar organic impurities, and treatments such as ion exchange to reduce the concentration of multivalent metal cations.

Alkaline earth metal cations that are often present in the raw brine solution include calcium and magnesium. The calcium and magnesium concentrations in the raw brine solution may each independently be in the range of about 0.005 parts per million (ppm) to about 2000 ppm, preferably in the range of about 0.005 ppm to about 400 ppm, and more preferably in the range of about 0.005 ppm to about 10 ppm. For maximum membrane lifetime and efficiency of electrolysis cell operation the sum of the concentrations of both calcium and magnesium in the purified electrolyzer feed brine solution is most preferably in the range of less than about 20 ppb.

Multivalent cations, such as transition metal cations, that are often present in the raw brine solution include iron, chromium, and nickel. The iron, chromium, and nickel concentrations in the brine solution prior to the purification process of the invention may each independently be in the range of about 0.001 ppm to 100 ppm, preferably in the range of about 0.001 ppm to about 10 ppm, and more preferably in the range of about 0.001 ppm to about 2 ppm. For maximum membrane lifetime and efficiency of electrolysis cell operation and in order to achieve membrane specification levels of alkali metal cation levels in the membrane electrolyzer feed brine, the concentration of iron and chromium in the purified brine solution are most preferably each independently in the range of about 0.001 ppm to about 0.1 ppm and the concentration of nickel in the purified brine is most preferably below about 10 parts per billion (ppb). In particular, it was found that the presence of iron in the feed brine precludes achieving membrane specification levels of alkaline earth metal cations in the purified brine and causes fouling of membranes in electrolyzers.

Brine solutions, as contemplated in the present invention, contain a water-soluble metal chelating agent which may form water-soluble complexes with multivalent metal cations, particularly transition metal cations. Typical water-soluble chelating agents include N,N,N',N'-ethylenediarnine-tetraacetic acid (EDTA), nitrilotriacetic acid (NTA), gluconic acid, and all of their sodium salts. Sodium gluconate is particularly preferred in the brine solutions of this invention. The preferred concentration of water-soluble metal chelating agent in the brine solution prior to the purification process of the invention is in the range of about 10 ppm to about 2000 ppm, and the more preferred concentration is in the range of about 50 ppm to about 1200 ppm.

In general membrane separators are more sensitive to contaminants than diaphragm separators. Impurities which affect membrane cell performance and which may be present in the brine from a condensation polymerization process include, but are not limited to, calcium, magnesium, strontium, barium, nickel, mercury, aluminum, iron, and silica.

Impurities have different effects on the membrane and different amounts of the various impurities may be present before the system is fouled. For instance, calcium and magnesium at about 20 parts per billion (ppb) will begin precipitating in the membrane as hydroxides. Strontium at about 500 ppb will begin precipitating in the membrane. Barium at about 1 part per million (ppm) will begin precipitating in the membrane. Sodium sulfate at concentrations of about 10 grams/liter result in a decline in the efficiency of the cell.

As mentioned, the brine solution comprises a water soluble metal chelating agent, such as sodium gluconate. Water soluble metal chelating agents, such as sodium gluconate, exhibit a strong affinity for trivalent cations, such as ferric, chromium, and aluminum ions, and a modest affinity for divalent cations, such as calcium and magnesium. A process that removes multivalent cations from a gluconate containing stream must, therefore, overcome this interaction.

Complex metal-gluconate equilibria determine the composition of a stream that contains multivalent metal ions such as iron or calcium. These equilibria are strongly affected by the pH of the brine solution. For example, the iron-gluconate interaction is very strong under all alkaline conditions, from a pH of about 8 up to 35 wt % NaOH solutions. However, the interaction is relatively weak under acidic conditions. For example, at pH 2.5, rather than being complexed with gluconate, about 30% of the iron exists as free ferric ion.

It has been discovered that by modifying the secondary brine treatment process, membrane specification levels of alkaline earth metals in brines that are byproducts of condensation polymerization manufacturing operations may be achieved. Specifically, it has been discovered that if transition metals are first removed, the ion exchange process for alkaline earth metal removal is able to achieve membrane specification levels of alkaline metal concentration in the brine.

Prior to the modified secondary brine treatment process, as contemplated in the instant invention, the raw brine solution, from a condensation polymerization reaction, for instance, preferably undergoes primary brine treatment. Primary brine treatment helps to minimize the impurities in the brine solution before secondary brine treatment.

As mentioned, in primary brine treatment, the brine pH is elevated to above about 10 in the presence of a molar excess of carbonate ion in order to precipitate alkaline earth and transition metals as their carbonates and/or hydroxides, followed by a filtering and/or settling process such as clarification. This is followed by acidification and stripping of the brine to remove carbonate ion as well as volatile organic contaminants such as organic solvents and dissolved catalysts. Additional treatment such as adsorption may be utilized as necessary to remove organic species such as monomer and low molecular weight oligomer from the brine.

In the present invention, the adjustment of the pH to produce some free ferric iron is utilized after primary brine treatment. The removal of iron and other trivalent species in a first stage is necessary to enable successful removal of divalent alkaline earth metal cations in a second stage and thus achieve membrane specification levels of alkaline earth metals in the brine, which prevents fouling of the membrane.

In the present invention, a two stage process is employed, preferably after primary brine treatment. In a first stage, the pH of the brine solution is adjusted to a pH of from about 2 to about 4 and the brine solution is passed through a first functionalized resin; the first functionalized resin having functional groups capable of removing multivalent metal cations, including iron cations, from the brine solution. In a second stage, the pH of the brine solution is adjusted to a pH of from about 9 to about 11.5 and the brine solution is passed through a second functionalized resin, the second functionalized resin having functional groups capable of removing alkaline earth metal cations from the brine solution.

In the first stage of the process of the present invention, the pH of the gluconate-containing brine solution is adjusted from its initial pH to a pH of from about 2 to about 4, more preferably about 2.5 to about 3.5, even more preferably about 2.5. The initial pH is typically weakly alkaline, pH 8–10, which is common for brine storage after primary brine treatment. Typical means of adjusting the pH to the desired range include addition to the brine solution of a sufficient amount of at least one mineral acid. Hydrochloric acid is particularly preferred in the application of the present invention.

Following adjustment of the pH, the brine solution is then intimately contacted with at least one resin bed comprising a first functionalized resin. The first functionalized resin may be any resin capable of removing multivalent metal cations, including but not limited to, iron, nickel, aluminum or mixtures thereof.

Ion exchange resins suitable as the first functionalized resin include, but are not limited to chelating ion exchange resins. Chelating ion exchange resins that are effective for iron removal include iminodiacetic acid functionalized resins (IDA) and aminomethyl phosphonic acid (AMP) functionalized resins. Although AMP functionalized resin has about 20% more iron capacity than IDA, only about 13 to about 25% of the iron loaded onto AMP resin is recovered during regeneration. For this reason, IDA functionalized resins are preferred.

Commercially available IDA resins such as AMBERLITE IRC-718, manufactured by Rohm & Haas Co. or LEWATIT TP207, manufactured by Bayer, may be used in the first functionalized ion exchange resin bed.

The first functionalized resins preferably have an ion exchange capacity from about 0.1 milliequivalents of metal ion per milliliter of resin to about 3 milliequivalents of metal ion per milliliter of resin, and preferably from about 0.5 milliequivalents of metal ion per milliliter of resin to about 1.5 milliequivalents of metal ion per milliliter of resin.

Contact of the gluconate-containing brine solution in the first functionalized ion exchange resin bed may be performed by methods known in the art, such as batch, continuous, or semi-continuous methods. In a preferred method, the brine solution is passed through a column containing a bed of the first functionalized ion exchange resin. Passage of brine through the column may continue until the metal ion complexing capacity of the resin bed is substantially exhausted as shown by an increase in the concentration of contaminating metal ions in brine solution exiting the column. When the metal ion complexing capacity of a resin bed is exhausted, then a fresh resin bed is employed for treatment of further brine solution. Exhausted ion exchange resin beds may be regenerated according to methods known in the art. These include, for example, acid treatment to strip cations from the resin bed followed by base treatment to return the resin to the sodium form prior to being placed back into service. Ion exchange processes are described by C. Dickert in "Ion Exchange" Kirk-Othmer Encyclopedia of Chemical Technology, fourth edition, vol. 14, pp. 760–770 (1995).

In the first stage, the brine is intimately contacted with the first functionalized ion exchange resin bed in a continuous or semi-continuous process and the flow rate of brine over the resin bed ranges from about 1 resin bed volumes per hour to about 30 resin bed volumes per hour. More preferably, the flow rate in a continuous process is in the range of about 8 resin bed volumes per hour to about 25 resin bed volumes per hour. As used in the present invention, a flow rate expressed as 10 resin bed volumes per hour indicates, for example, that 5 gallons of the brine solution is contacted with 0.5 gallons of a chelating ion exchange resin per hour. The temperature for contacting the brine solution with the ion exchange resin bed ranges from about 20° C. to about 90° C., more preferably from about 40° C. to about 70° C., even more preferably about 60° C.

The brine solution recovered from treatment with the first functionalized ion exchange resin contains a significantly reduced concentration of multivalent metal cation contaminants. The amount of multivalent metal cations that is removed depends, among other factors, upon the initial metal cation concentrations, the pH to which the brine solution is adjusted, and the volume of first functionalized ion exchange resin with which the brine solution comes into contact.

Typically, the concentrations of iron, chromium, and nickel cations are each reduced to below their detection limits in the brine solution following contact with the first functionalized ion exchange resin. This is surprising in view of the strong interaction between the metal cations and gluconate. Because of this strong interaction, a fraction of multivalent metal cation contaminants removed from the thus treated brine was present in the form of water-soluble complexes with a metal chelating agent. In particular, a substantial fraction of the iron removed as a contaminant from the thus treated brine solution was initially present in the form of a water-soluble gluconate complex.

After the passage of the brine from the first functionalized resin, the pH of the brine solution is readjusted to a pH of from 9 to about 11.5. Typical means of adjusting the pH to the said range include one or more steps of addition to the brine solution of a sufficient amount of an alkali metal compound, such as an alkali metal hydroxide.

Suitable alkali metal compounds which may be used to adjust the pH in the brine solution include, but are not limited to, sodium hydroxide, potassium hydroxide, lithium hydroxide or a mixture thereof. Sodium hydroxide is preferred.

Following the adjustment of the brine solution to a pH of from about 9 to about 11.5, preferably to about 10, the brine is intimately contacted with a second functionalized ion exchange resin bed in a batch, continuous, or semi-continuous process and the flow rate of brine over the resin bed ranges from about 1 resin bed volume per hour to about 25 resin bed volumes per hour, more preferably between about 5 resin bed volumes per hour and about 15 resin bed volumes per hour. The brine is preferably passed through the second functionalized ion exchange resin bed at a temperature of from about 20° C. to about 90° C., preferably from about 40° C. to about 70° C., even more preferably about 60° C.

The second functionalized ion exchange resin functions to remove the "hardness" from the brine solution. As used herein, "hardness" refers to alkaline earth metal cations, including but not limited to cations of calcium, magnesium, barium, strontium or mixtures thereof. The second functionalized resin may be any resin capable of removing hardness. Amino methyl phosphonic acid functionalized (AMP) ion exchange resins are preferred. Suitable AMP resins include DUOLITE 467, manufactured by Rohm and Haas company and LEWATIT OC 1060, manufactured by Bayer. It is necessary to remove trivalent metal cations from the gluconate-containing brine prior to introduction of the brine to the second functionalized resin.

Although hardness is primarily removed in the second stage, the first stage, comprising adjustment of the pH to from about 2 to about 4 and passage of the brine solution through a first functionalized resin, serves to protect the AMP resin from iron contamination, as iron is essentially irreversibly adsorbed or ion exchanged onto AMP resin.

Contact of the brine solution in the second functionalized ion exchange resin bed may be performed by methods known in the art, such as batch, continuous, or semi-continuous methods. In a preferred method, the brine solution is passed through a column containing a bed of the second functionalized ion exchange. Passage of brine through the column may continue until the capacity of the resin bed is substantially exhausted as shown by an increase in the concentration of contaminating alkaline earth metal cations in the brine solution exiting the column. When the metal ion complexing capacity of a resin bed is exhausted, then a fresh resin bed is employed for treatment of further brine solution. Exhausted ion exchange resin beds may be regenerated according to methods known in the art.

When brine solution from a polymer manufacturing process treated by the method of the present invention is electrolyzed in an electrolysis cell, the separator in such a cell exhibits a significantly longer lifetime. The increased lifetime is due to the decreased deposition on the surface of and within the separator of solid species derived from contaminating multivalent metal cations in the brine solution. In particular, a membrane separator in an electrolysis cell exhibits a significantly longer lifetime using brine treated by the method of the present invention.

This invention has been described in detail with particular reference to preferred embodiments thereof, but it will be understood that variations and modifications can be effected within the spirit and scope of the invention. In particular, although the invention has been described in reference to a membrane electrolyzer, the process as described may also be used in other processes, for instance those utilizing a diaphragm for separation.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperatures, etc.) but some error and deviations should be accounted for.

Unless indicated otherwise, parts are by weight and temperature is in ° C. In the processes described, unless stated otherwise, the pressure is at or near atmospheric.

Example 1

Brine was treated in two stages to achieve membrane electrolyzer brine specification levels of hardness and heavy metals. In the first stage, the brine was treated at low pH by an iminodiacetic acid-functionalized chelating ion exchange resin (IDA resin) to remove heavy metals. In the second stage, the brine was treated at elevated pH with an aminomethyl phosphonic acid-functionalized chelating ion exchange resin (AMP resin) to remove hardness. The details of the two steps are given in Table II. The brine contained 300 grams per liter (gpl) NaCl and 80 ppm sodium gluconate. The crude and purified production brine compositions are shown in Table I.

This example shows that the process of this invention may be used to achieve membrane electrolyzer specification brine impurity levels for hardness and heavy metals in the presence of 80 ppm sodium gluconate.

TABLE I

Production Brine Composition

| Component | Raw Brine | Purified Brine | Specification |
|---|---|---|---|
| Ca | 0.6 ppm | 11 ppb | Ca + Mg |
| Mg | 0.2 ppm | 7 ppb | <30 ppb |
| Fe | 0.3 ppm | <0.07 ppm | 0.5 ppm |

TABLE II

Brine Purification Conditions

| | Step I | Step II |
|---|---|---|
| Resin Type | IDA-Functionalized Polystyrene (AMBERLITE IRC-718) | AMP-Functionalized Polystyrene (DUOLITE C-467) |
| Bed Volumes/hr | 10 | 10 |
| Feed pH | 2.5–3.5 | >11 |
| Temperature | 60° C. | 60° C. |

Example 2

This example shows that the process of this invention may be used to achieve membrane specification brine impurity levels for hardness and heavy metals in the presence of 350 ppm sodium gluconate.

TABLE III

Production Brine Composition
300 gpl NaCl
350 ppm sodium gluconate

| Component | Crude Brine | Purified Brine | Specification |
|---|---|---|---|
| Ca | 2.8 ppm | 6 ppb | Ca + Mg |
| Mg | 10.2 ppm | 0.4 ppb | <30 ppb |
| Fe | ≈0.3 ppm | <0.05 ppm | 0.5 ppm |

TABLE IV

Brine Purification Conditions
300 gpl NaCl

| | Step I | Step II |
|---|---|---|
| Resin Type | IDA-Functionalized Polystyrene (AMBERLITE IRC-718) | AMP-Functionalized Polystyrene (DUOLITE C-467) |
| Space Velocity (Bed Volume/hr) | 10 | 10 |
| Feed pH | 2.5–3.5 | 9–10 |
| Temperature | 60° C. | 60° C. |

Comparative Example 3

This example shows the necessity of removing iron before removing hardness in gluconate-containing brines.

The feed brine contained 0.32 ppm iron, 2.0 ppm Ca, 0.81 ppm Mg, and 390 ppm sodium gluconate. The brine contained 300 gpl NaCl.

| Feed pH | 9–10 |
|---|---|
| Feed Rate | 3.3 bed volumes/hr |
| Temperature | 60° C. |

In this case, only a single ion exchange step was performed on the brine. An AMP type resin was used to treat the brine for hardness removal without removing the iron and other heavy metals first. The product hardness level was <10 ppm Mg and 50 ppb Ca, which is above the membrane electrolyzer specification for calcium. Without being bound by any theory, it is believed that the presence of iron in the feed (as iron gluconate complex) interfered with the ion exchange process for calcium by continuously displacing calcium from the ion exchange resin.

Comparative Example 4

This example shows the necessity of removing iron before removing hardness in gluconate-containing brines.

Feed Brine Composition:

300 ppm sodium gluconate 0.72 ppm Mg 5.8 ppm Ca 1.90 ppm Iron (Fe)

Feed pH 10.3

60 degrees C 50 gm resin (AMP resin)

14 gm/min brine feed rate (12.6 bed volumes/hr)

The effluent composition is shown in Table V. This shows that the ion exchange resin is unable to remove hardness to levels required for membrane cell operation if the brine contains both iron and gluconate. The higher effluent concentration of both Mg and Ca (vs comparative example 3) is attributed to the higher level of iron in this example (vs comparative example 3). This example further shows that the iron was only partially removed under these conditions.

TABLE V

| Hours | Fe (ppm) | Ca (ppm) | Mg (ppb) |
|---|---|---|---|
| 24 | 0.42 | 0.14 | 60 |
| 48 | 0.64 | 0.14 | 40 |
| 72 | 0.90 | 0.25 | 40 |
| 96 | 1.09 | 0.43 | 35 |
| 120 |  | 0.674 | 42.4 |

What is claimed is:

1. A method for removing impurities from a brine solution comprising trivalent metal cations and alkaline earth metal cations, the brine solution further comprising a water soluble metal chelating agent, the method comprising the steps of:
   a) adjusting the pH of the brine solution to a pH of from about 2 to about 4;
   b) passing the brine solution through a first functionalized resin; the first functionalized resin having functional groups capable of removing multivalent metal cations from the brine solution, thereby reducing the concentration of trivalent metal cations in the brine solution;
   c) adjusting the pH of the brine solution to a pH of from about 9 to about 11.5; and
   d) passing the brine solution through a second functionalized resin; the second functionalized resin having functional groups capable of removing alkaline earth metal cations from the brine solution, thereby reducing the concentration of alkaline earth metal cations in the brine solution.

2. The method of claim 1, further comprising the step of pretreating the brine solution in a primary brine treatment stage, prior to step a).

3. The method of claim 1, wherein the first functionalized resin removes iron, nickel, chromium, aluminum or mixtures thereof.

4. The method of claim 1, wherein the second functionalized resin removes calcium, magnesium, barium, strontium or mixtures thereof.

5. The method of claim 1, further comprising the step of e) recovering the brine solution.

6. The method of claim 1, wherein the first functionalized resin is an imino diacetic acid functionalized ion exchange resin.

7. The method of claim 1, wherein the second functionalized resin is an amino methyl phosphonic acid functionalized ion exchange resin.

8. The method of claim 1, wherein the brine solution in step d) is passed through the second functionalized resin at a space velocity of from about 1 to about 15 bed volumes per hour.

9. The method of claim 8, wherein the temperature of the brine solution is from about 20° C. to about 90° C.

10. The method of claim 9, wherein the temperature of the brine solution is from about 20° C. to about 80° C.

11. The method of claim 1, wherein the brine solution in step b) is passed through the first functionalized resin at a space velocity of from about 1 to about 30 bed volumes per hour.

12. The method of claim 11, wherein the temperature of the brine solution is about 60° C.

13. The method of claim 1, wherein the brine solution in step b) is passed through the first functionalized resin at a space velocity of from about 1 to about 15 bed volumes per hour, and the brine solution in step d) is passed through the second functionalized resin at a space velocity of from about 4 to about 8 bed volumes per hour.

* * * * *